Patented Nov. 4, 1941

2,261,759

UNITED STATES PATENT OFFICE 2,261,759

RESINOUS COMPOSITION AND METHOD OF PREPARATION

Charley Gustafsson, Helsingfors, Finland, assignor to Johan Bjorksten

No Drawing. Application November 2, 1938, Serial No. 238,440

16 Claims. (Cl. 260—79)

This invention relates to resinous compositions and to methods of preparing such compositions, and more particularly to varnish like or lacquer like compositions and resin solutions and to methods of preparing the same from inexpensive hydrocarbon materials, to paints prepared from such resins and to articles coated or impregnated with such compositions.

Numerous methods are known for preparing resins from hydrocarbons, however, all those methods which have employed as raw materials inexpensive products containing mixtures of a great number of different hydrocarbons have resulted in the production of by-products consisting of heavy resinous oils, or solid materials having very low melting points. These by-products, unless removed, impart undesirable properties to the final products; for example, excessive softness, tackiness, and the like. The removal of these by-products can be effected only by cumbersome and costly steps in the process of manufacture, such as separation of the by-products from the resins by processes involving extraction, distillation or the like.

One of the objects of this invention is to obviate the need for such purification steps in the preparation of drying solutions of hydrocarbon resins, or varnish like materials from inexpensive hydrocarbon materials. These products when exposed to air dry to form a hard tenacious film of good adhesion to glass, metals and the like.

Another object of this invention is to provide a method of preparing such products without the use of chlorine, but by the use of more easily handled reagents.

Another object of this invention is to provide new hydrocarbon resins having exceptional repellent properties to forms of organic life which ordinarily attack organic structural materials.

Another object of this invention is to provide a method of preparing, from inexpensive hydrocarbon materials, varnish like or impregnating compositions which have exceptional repellent properties for forms of organic life which attack fibrous organic materials.

Another object of this invention is to provide a method of preparing, from inexpensive hydrocarbon materials, paints which are highly resistant to mold, and repellent to such forms of organic life which attack wood and other structural materials of organic origin.

Another object of this invention is to prepare, by a simplified method, drying solutions of hydrocarbon resins.

Another object of this invention is to provide impregnated wood which is more permanently resistant to the action of organic life than has heretofore been possible.

Another object of this invention is to permanently protect wood from the action of wood attacking organisms such as fungi, bacteria, shipworms, termites, and the like.

Another object of this invention is to provide wood impregnating agents of extreme permanence and resistance to moisture.

Another object of this invention is to provide a method whereby wood may be impregnated with a disinfectant, but without affecting the adaptability of the wood to be painted or varnished.

Further objects and advantages will become apparent from the following detailed description of this invention.

In accordance with the present invention, a hydrocarbon material containing appreciable amounts of unsaturated and/or aromatic hydrocarbons or hydrocarbon derivatives is permitted to react with a highly reactive reagent containing both sulfur and chlorine in reactive form. Examples of such reagents which may be employed satisfactorily are sulfuryl chloride, sulfur chloride, chloro sulphonic acid, and the like. The reaction product is allowed to polymerize by contact with a polymerization catalyst, such as aluminum chloride.

On completion of the polymerization reaction the catalyst is removed from the mass, for example by washing with water. To facilitate the washing operation the viscosity of the product may be reduced by adding a thinning solvent such as a fraction of cracked petroleum. Generally, the product is readily miscible with all petroleum solvents which contain substantial amounts of unsaturated and/or aromatic hydrocarbons or their derivatives.

By variations of this process a number of products are obtainable, varying in drying qualities, odor, softness of the solid resin constituent, melting point, color and the like. The preferred procedure, as indicated by examples, 1, 4 and 5, which follow, yields a drying solution of solid hydrocarbon resins, or varnish like materials which on application to glass, metal, wood and the like, and subsequent exposure to the atmosphere yields a hard tenacious film of good adhesion to the surfaces of these substances. Intermixed with pigments and other common paint ingredients the compositions form useful paint products of exceptional repellency to wood attacking organisms. Applied as an impregnating agent it permanently protects wood, fiber board and the like from attacks by termites, molds and the like.

Various aspects of the invention are illustrated in the following examples. As is apparent from the foregoing, the invention is capable of great variation, and is not limited to the particular raw-materials, procedures and manipulations set forth in the examples.

*Example 1*

30 parts by weight of sulfuryl chloride are added, in small portions and with agitation to 40 parts by weight of a fraction of vapor phase cracked petroleum boiling between 30° and 220° C., and having a specific gravity of 0.868 and a bromine number of 0.515. A strongly exothermic reaction results, with the evolution of sulfur dioxide and hydrogen chloride, which evolution products may be recovered by means well known to the art. The reaction is brought to completion by heating for a short period, as by means of steam at atmospheric pressure for 15 minutes. The composition is allowed to cool to about room temperature. 2½ parts by weight of aluminum chloride are then added in small portions. Polymerization results and the composition darkens with an accompanying rise in temperature. At this stage of the process, I prefer to keep the temperature of the composition between about 40° and 50° C., for example by cooling, or by regulating the rate of addition of the catalyst so that the temperature remains within these limits. During the polymerization reaction further quantities of hydrogen chloride are evolved which may be recovered by means known to the art. When the evolution of gas has substantially ceased, the reaction product, which is now a high viscous oil, is heated, as by means of steam at substantially atmospheric pressure for an additional half hour, for example in a jacketed kettle, or on a water bath.

In order to facilitate removal of the catalyst, the viscosity of the product is reduced by addition of about 15 parts by weight of a suitable thinning solvent, such as for example a cracked petroleum fraction miscible with the product, benzene, carbon tetrachloride, or the like. In this specific example 15 parts of the petroleum fraction was employed, the fraction was identical to that employed as the raw material described above. This thinning solvent is added solely to facilitate washing by reducing the viscosity and no chemical reaction takes place on the addition thereof.

The catalyst is removed by washing with water in any of the numerous ways well known to the art, and the remaining product is treated with a drying agent, such as calcium chloride, for the purpose of drying. The drying agent is separated from the solution by decanting, centrifugation, or the like.

The yield is 49 parts by weight of a low viscous dark brown liquid, consisting of 38% solid resin and 62% volatile matter. When applied to a surface of glass, metal, wood, or the like and upon exposure to the atmosphere, this liquid dries within an hour to a somewhat tacky film, which within a day forms a hard, tenacious film of excellent adhesion to the above mentioned surfaces. The material and film is very strongly repellent to forms of organic life which attack organic structural materials such as shipworms, termites, fungi, and the like. Analysis of the film showed the presence of both sulfur and chlorine.

A composition which dries to form a film of less hardness and tenacity than that obtained by following the above procedure may be formed by the following departures from such procedure: (a) the employment of a substantially lower amount of the catalyst, (b) permitting the polymerization to proceed at a temperature substantially lower than 40° C., (c) the presence of the catalyst during the addition of the sulfuryl chloride, (d) the use of a substantially smaller amount of sulfuryl chloride, or (e) the interruption of the polymerization step prior to its completion.

In the event of major departures from the proportions or procedures of the foregoing example, the product obtained might even remain permanently tacky or fluid on contact with the atmosphere. Such non-drying products may be desired in some instances for example for preventing growth of organic life, such as plants, on roads or the like, and similar applications. For most purposes, however, the procedures and proportions as set forth above and in the following examples, are preferable.

*Example 2*

50 parts by weight of sulfuryl chloride are gradually added in small portions to 50 parts of a fraction of a petroleum product prepared by catalytic condensation at 1150°–1200° F. of gases formed by vapor phase cracking of petroleum, said fraction boiling between 40° and 200° C. and having a specific gravity of 0.840 and a bromine number of 0.474. The gases formed during the reaction between the sulfuryl chloride and the petroleum product may be recovered by means well known to the art. The reaction is brought to completion by heating over a water bath for about 30 minutes. Five parts of aluminum chloride are then added gradually with agitation. During the addition of this catalyst the temperature is preferably maintained below 50° C. When the reaction is completed, as evidenced by cessation of evolution of acid gases, the product is polymerized as described in Example 1. To reduce the viscosity of the mass before washing, the reaction product is diluted with 15 parts by weight of the same type of hydrocarbon material used as raw material described above. The catalyst is removed by treating with water, and the water is subsequently removed in any manner well known to the art. The yield is 53 parts by weight of a brown oily liquid, which on exposure to air dries to a hard, tenacious film and is extremely repellent to wood attacking organisms.

*Example 3*

15 parts by weight of sulfuryl chloride are added to 50 parts of a petroleum fraction such as used as the raw material in Example 1. The reaction is brought to completion by heating for 5 hours with steam at substantially atmospheric pressure, for example in a jacketed kettle or on a water bath. Three parts of aluminum chloride are added and the composition polymerized, as in Example 1. The resulting product is thinned by the addition of 10 parts by weight of benzol, washed with water, dried with calcium chloride and centrifugated to remove the drying agent. The yield is 52 parts by weight of a dark brown film forming resin solution.

*Example 4*

40 parts by weight of sulfuryl chloride are added to 50 parts by weight of a fraction of a polycondensate prepared by catalytic condensation at 1150–1200° F. of the gaseous by-products from the operation of cracking gas oil in liquid phase under high pressure. The fraction used boils between 35° and 200° C., has a specific gravity of 0.784 and a bromine number of 0.924. The reaction is brought to completion by permitting the reaction mixture to remain for about 14 hours at room temperature. Thereupon three parts by weight of aluminum chloride are added, with agitation. When the initial reaction has subsided, the mixture is heated with steam at substantially atmospheric pressure for 1½ hours. The resulting material is diluted with 20 parts by weight of the same type of petroleum fraction as used as the raw material in Example 1, is washed with water, dried with calcium chloride and centrifugated for removal of these agents. The yield is 48 parts by weight of a dark brown liquid containing 37% solid resin. This liquid when exposed to the atmosphere in thin layers dries to a hard tenacious film of good adhesion to glass, metals, wood and the like, and possesses good repellent properties for wood attacking organisms.

Example 5

17 parts by weight of sulfur chloride are added gradually with agitation and cooling to 35 parts by weight of the same type of fraction of cracked petroleum as used as the raw material in Example 1. The temperature is maintained below 18° C. throughout the reaction period. When the initial reaction has subsided, the mixture is allowed to stand two additional hours at room temperature. After this period, four parts by weight of aluminum chloride are added gradually and the temperature is maintained below 50° C. When the ensuing reaction has subsided, the reaction mixture is heated for ½ hour with steam at substantially atmospheric pressure. The resulting material is then diluted with 35 parts by weight of benzol to reduce its viscosity, washed with water for removal of the catalyst, and dried by distilling off 20 parts by weight of liquid. This distillate consists principally of benzol, which was added as a thinning solvent, and of water which is carried over with the benzol, whereby drying is effected. The yield is 48 parts by weight of a dark brown resin solution containing 33% solid resin. On exposure to the atmosphere in thin layers this liquid dries to a hard film of excellent adhesion and tenacity and is repellent to wood attacking organisms.

Example 6

25 parts of a fraction of hydrocarbon polycondensate, prepared by catalytic condensation at 1050–1100° F. of the gaseous by-products from vapor phase cracking of petroleum is added slowly with agitation to 25 parts by weight of sulfur chloride. This polycondensate boils between 40° and 175° C., has a specific gravity of 0.784 and a bromine number of 1.308. The temperature during the reaction is maintained below 50° C. and cooling is applied when necessary. Upon completion of the reaction, as evidenced by cessation of the evolution of gases, three parts of aluminum chloride are added gradually with agitation. The ensuing polymerization reaction is brought to completion by heating for ½ hour with steam at substantially atmospheric pressure. 15 parts by weight of benzol are added as a thinning solvent. The composition is washed with water, dried with calcium chloride, and centrifugated for removal of the drying agent. The yield is 45 parts by weight of a dark brown resin solution, which when applied to glass, wood or the like and exposed to the atmosphere hardens to a tenacious, very adherent film.

Example 7

50 parts by weight of the drying resin solution prepared according to Example 1 are distilled at atmospheric pressure until the temperature of the distilling liquid has reached 170° C. and then in 15 mm. vacuum until the temperature of the distilling liquid is 190° C. The residue is 19 parts by weight of an unsaponifiable dark resin, which contains appreciable amounts of both chlorine and sulfur. This resin is soluble in solvents containing appreciable amounts of aromatic or unsaturated aliphatic hydrocarbons, in carbon tetrachloride and in drying vegetable oils, such as linseed oil, tung oil, oiticica oil, and the like. It is insoluble in water, lower aliphatic alcohols, acids, alkalies, and saturated hydrocarbons.

The above examples illustrate some applications of the invention. They are given for the purpose of illustration only, and should not be construed as limitations.

While the proportions and procedures given above generally are illustrative of preferred embodiments, I may in many instances change or modify them according to the qualities desired in the final product. For example, softer or even permanently liquid and non-drying products may be obtained by the following modifications of the process: by the presence of a Friedel-Crafts type catalyst during the reaction between the hydrocarbon material and the sulfur and chlorine containing reagent; by the interruption of the polymerization reaction substantially before completion; by the use of much smaller amounts of catalyst or by the use of less effective catalysts, such as ferric chloride, stannic chloride, zinc chloride, or the like. It may be stated that aluminum chloride generally gives by far the most rapidly and completely drying reaction products. These materials, as is well known, are examples of a Friedel-Crafts condensation catalyst. Further, such products may also be obtained by employing substantially less reagent containing chlorine and sulfur than indicated in the examples, or by maintaining the temperature substantially below room temperature during the polymerization reaction.

Such softer or permanently tacky products may be desired as impregnating and/or fungicidal or insecticidal agents in some specific applications, but generally I prefer to avoid their formation by using proportions and procedures substantially within the ranges indicated by the examples given.

Certain hydrocarbon materials react readily with the sulfur and chlorine containing reagents, but the reaction product does not dissolve sufficient aluminum chloride to result in rapid and complete polymerization. Such materials are for example crude vapor- or liquid-phase cracked petroleums. While the present invention may produce products of some usefulness when applied to such materials, reaction times and/or temperatures being increased to compensate for the low solubility of the catalyst, or some solvent for the catalyst being added, I generally prefer to employ hydrocarbons which react with sulfur and chlorine containing highly reactive reagents to form reaction products which have adequate solvent power for aluminum chloride. This solvent power can be readily determined by experiment in each instance, but generally it is roughly proportional to the amount of unsaturated or aromatic hydrocarbons present in the hydrocarbon material used for the reaction.

Although reference is made in the above examples to the specific use of sulfuryl chloride and to sulfur chloride, it is readily apparent that analogous reaction products of similar properties are obtainable if other highly reactive sulfur and chlorine containing reagents are employed, such as for example sulfur dichloride, sulfur tetrachloride, chloro sulphonic acid, pyro sulfuryl chloride, and the like.

The products of the above examples are suitable for protecting wood, fiber board materials, and the like, from the attack of organisms such as termites, shipworms, fungi and the like. Such applications are illustrated by the following examples:

Example 8

The dark brown, low viscous liquid prepared by the procedure of Example 4 is applied to fiber board material with a brush. The fluid penetrates very rapidly, and imparts to the fiber board material excellent organism repellent properties. These properties are not lost or substantially impaired with time, even upon prolonged exposure to moisture. The fiber board material thus treated can be painted readily, and will retain paint coatings indefinitely.

Example 9

Wood, previously dried and subjected to air at elevated pressures such as 100 to 200 pounds per square inch, is immersed without reduction in pressure in a bath containing the low viscous resin solution obtained according to Example 5, at an elevated temperature insufficient to char the wood for about 4 to 6 hours. When absorption of the mixture is complete the bath is allowed to cool slowly to about 140° to 170° F. and the pressure is then released. The wood thus treated is permanently protected from the attacks of termites, shipworms and the like.

Other impregnation methods are also suitable as will be understood by those familiar with the art.

The products of this invention are also useful in the art of compounding paints and lacquers. Paints prepared from these products have the advantages of very low cost, excellent brushing qualities, very high resistance to mildew and other fungous growths, and repellency to termites, wood attacking larvae, and the like.

Such applications are illustrated by the following examples:

Example 10

89 parts of the resin solution obtained according to Example 1 are intermixed with 11 parts of a boiled linseed oil containing ¼% of lead naphthenate and ¼% of manganese naphthenate. The product thus obtained is a rapidly drying varnish, giving a tenacious film of very good resistance to water and excellent adhesion to glass, metal, wood and the like.

Example 11

54 parts of the resin solution obtained according to Example 4 are intermixed with 3 parts of chlorinated rubber having a viscosity of 2000 centipoise in 20% toluene solution at 25° C., 18 parts of aluminum powder and 18 parts of toluene. The product obtained is particularly suitable for painting tanks, metal containers, and the like.

Example 12

60 parts of the resin solution prepared according to Example 5 are intermixed with 7 parts of boiled linseed oil containing ½% of cobalt naphthenate, and subsequently with 33 parts of red iron oxide. The resulting paint is a rapidly drying inexpensive product, suitable for farm use.

Example 13

60 parts of dried linseed oil containing ½% of cobalt drier are intermixed with 7 parts of the resin solution prepared according to Example 5, and with 33 parts of chromium yellow. The resulting paint is resistant to mildew and repellent to termites, wood boring larvae, and the like.

Obviously, an almost infinite variety of combinations is possible in compounding paints and lacquers utilizing the present invention. Other materials previously used as paint ingredients may be included, such as thinners, pigments, dyes, oils, natural and synthetic resins other than those mentioned in the examples, and the like. Variations, additions and substitutions of such ingredients or changes in their proportions obviously fall within the spirit and scope of the present invention. The specific examples given should not be construed in any sense of limitation, since they have been presented only to illustrate the invention.

I claim:

1. A composition of matter comprising a resin solution obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of sulfuryl chloride, sulfur chloride, chloro sulphonic acid, sulfur dichloride, sulfur tetra chloride and pyro sulfuryl chloride and thereafter polymerizing the reaction product by the use of a Friedel-Crafts type condensation catalyst.

2. A composition of matter comprising a resin solution obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of sulfuryl chloride, sulfur chloride, chloro sulphonic acid, sulfur dichloride, sulfur tetra chloride and pyro sulfuryl chloride and thereafter polymerizing the reaction product by the use of a Friedel-Crafts type condensation catalyst, the said solution being a brown liquid which when applied to glass, wood and the like surfaces and upon exposure to the atmosphere evaporates to form a tenacious, adherent film.

3. A composition of matter comprising a resinous material obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with sulfuryl chloride, and polymerizing the reaction product by the use of a Friedel-Crafts type condensation catalyst.

4. A composition of matter comprising a resinous material obtained by reacting a fraction of vapor phase cracked petroleum, the major part of which being distillable below 220° C. at atmospheric pressure, and containing a substantial proportion of unsaturated compounds, with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type condensation catalyst.

5. A composition of matter comprising a resinous material obtained by reacting a fraction of vapor phase cracked petroleum, the major part of which being distillable below 220° C. at atmospheric pressure, and containing a substantial proportion of unsaturated compounds, with a material selected from the group consisting of sulfuryl chloride, sulfur chloride, chloro sulphonic acid, sulfur dichloride, sulfur tetra chloride and pyro sulfuryl chloride and polymerizing the reaction product by the use of aluminum chloride.

6. A composition of matter comprising a resinous material obtained by reacting a condensate of gaseous hydrocarbons obtained as by-products in cracking operations, the major part of said materials being distillable below 220° C. at atmospheric pressure, and containing a substantial proportion of unsaturated compounds, with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type condensation catalyst.

7. A composition of matter comprising a resinous material obtained by reacting a condensate of gaseous hydrocarbons obtained as by-products in cracking operations, the major part of said materials being distillable below 220° C. at atmospheric pressure, and containing a substantial proportion of unsaturated compounds, with a material selected from the group consisting of sulfuryl chloride, sulfur chloride, chloro sulphonic acid, sulfur dichloride, sulfur tetra chloride and pyro sulfuryl chloride and polymerizing the reaction product by means of aluminum chloride.

8. A synthetic resin obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of surfuryl chloride, sulfur chloride, chloro sulphonic acid, sulfur dichloride, sulfur tetra chloride and pyro sulfuryl chloride, thereafter polymerizing the reaction product by the use of a Friedel-Crafts type condensation catalyst, removing the catalyst and evaporating the volatile constituents.

9. An article of manufacture comprising a solid covered with a surface film comprising a sulfur containing synthetic resinous material obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of sulfuryl chloride, sulfur chloride, chloro sulphonic acid, sulfur dichloride, sulfur tetra chloride and pyro sulfuryl chloride, and polymerizing the reaction product by contact with a Friedel-Crafts type condensation catalyst.

10. An article of manufacture comprising wood coated with a tenacious adherent film comprising a sulfur and chlorine containing resin and a pigment, said resin being obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of sulfuryl chloride, sulfur chloride, chloro sulphonic acid, sulfur dichloride, sulfur tetra chloride and pyro sulfuryl chloride, and polymerizing the reaction product with a Friedel-Crafts type condensation catalyst.

11. A paint-like coating composition comprising a resin solution and a pigment, said resin solution being obtained by reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type condensation catalyst.

12. The process of manufacturing a resin solution which comprises reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type catalyst.

13. The process of manufacturing a resinous material which comprises reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type condensation catalyst.

14. The process of manufacturing a sulfur containing synthetic resin which comprises reacting a material comprising a hydrocarbon material of the group consisting of materials substantially identical with cracked petroleum hydrocarbons and materials substantially identical with condensates of gaseous hydrocarbons obtained as by-products in cracking operations, the major part of said materials being distillable below 220° C. at atmospheric pressure; and containing a substantial proportion of unsaturated compounds; with sulfur chloride, polymerizing the reaction product by the use of aluminum chloride, removing the aluminum chloride from the polymerized product, and removing the volatile constituents from said washed polymerized product.

15. A resinous product obtained by reacting a fraction of vapor phase cracked petroleum, boiling substantially between 30° and 220° C. and having a bromine number of substantially .5, with sulfur chloride, and polymerizing the reaction product by the use of aluminum chloride, at a temperature below 50° C.

16. A permanently non-drying resinous product obtained by reacting a fraction of vapor phase cracked petroleum, boiling substantially between 30° and 220° C. and having a bromine number of substantially .5, with a material selected from the group consisting of sulfuryl chloride, sulfur chloride, chloro sulphonic acid, sulfur dichloride, sulfur tetra chloride and pyro sulfuryl chloride and polymerizing the reaction product by the use of a Friedel-Crafts type condensation catalyst at a temperature substantially below room temperature.

CHARLEY GUSTAFSSON.